Figure 1:
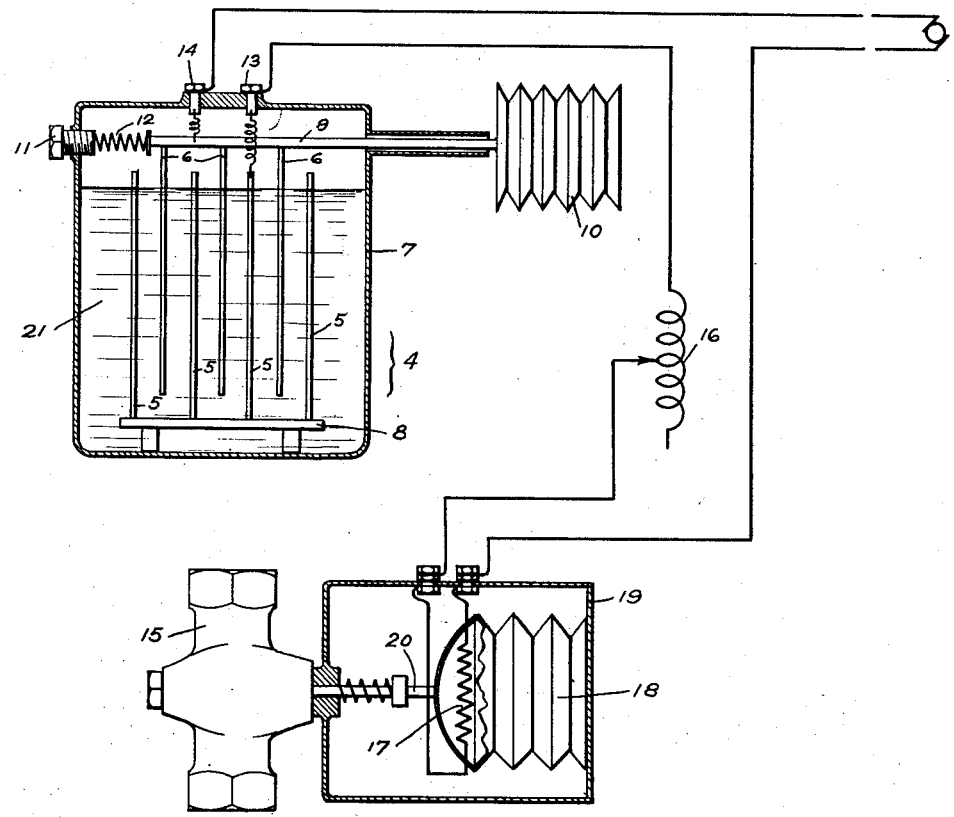

Oct. 18, 1932.    T. J. ATKINS    1,882,726

CONTROL SYSTEM

Filed Jan. 9, 1930

INVENTOR.
Thomas J. Atkins.
BY
ATTORNEYS.

Patented Oct. 18, 1932

1,882,726

UNITED STATES PATENT OFFICE

THOMAS JEFFERSON ATKINS, OF NORTH ARLINGTON, NEW JERSEY, ASSIGNOR TO CARRIER RESEARCH CORPORATION, OF NEWARK, NEW JERSEY, A CORPORATION OF NEW JERSEY

CONTROL SYSTEM

Application filed January 9, 1930. Serial No. 419,538.

This invention relates to control and measuring devices and more particularly to methods of electrically controlling or actuating devices responsive to changes in temperature and/or humidity.

The general object of the invention is to provide a system of thermostatic or hygrostatic control by varying the inductive reactance of a group of plates comprising a condenser, in an electrical circuit, whereby a control instrumentality will be concomitantly effected to produce desired regulation or measurement in associated devices.

Another object of the invention provides for the control of capacity reactance and inductive reactance in a given electrical circuit for multiplying the sensitivity of thermostatic, hydrostatic, or pressure-static devices.

In systems of thermostatic control, operated electrically, the control circuit is usually closed or opened responsive to thermal expansion or contraction of some material. Thus, the current in the circuit is completely on or completely off. The principle employed covers the provision of a number of contacts. When the temperature drops to one setting, certain contacts are closed, thereby effecting a steam valve or similar instrumentality, whereas when the temperature rises a pair of additional contacts are opened, thus reversing or modifying the operation. This same mode of operation applies to gas valves supplying burners and to similar devices in which control is desired responsive to atmospheric changes. While this type of control may be satisfactory where it is desired to widely vary conditions by wide variation in energy supply, applicant's system seeks to provide a mode of operation in which a supply of heat energy may be infinitely varied in quantity between any two limits.

A feature of the invention resides in the provision of a condenser whose capacity and hence its reactance will be varied responsive to thermostatic changes in a given area. Consequently, an associated thermostat will effect very sensitive regulation responsive to slight changes in capacity of the condenser in its control circuit.

Another feature of the invention covers the use of a condenser whose capacity will be in exact accordance with atmospheric conditions in a certain area and thereby regulate the current flow in a circuit in accordance with the temperature, humidity, or relative humidity existing in the given area.

Other objects and features of the invention, and the application of the principles involved, will be more apparent from the following description of illustrative adaptations of the invention, to be read in connection with the accompanying drawing, in which:—

Figure 2:
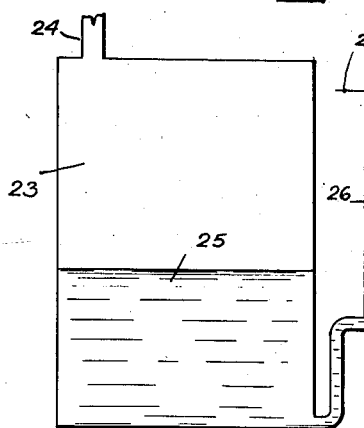
Figure 3:
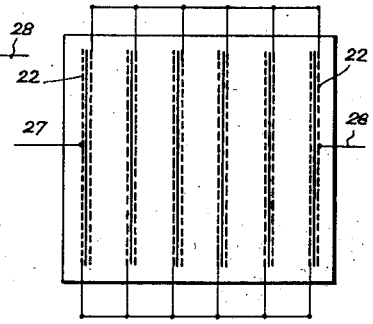

Fig. 1 represents a typical layout of an electrical circuit adapted to control a regulating device responsive to atmospheric conditions, Fig. 2 is a detail of one element of the arrangement in modified form, and Fig. 3 is a detail of a form of condenser adapted to control a circuit responsive to changes in relative humidity.

Considering the drawing, similar designations referring to similar parts, numeral 4 represents a thermostatic device having an internal structure in the form of an electrical condenser. For convenience we shall call device 4 a condenser thermostat. Plates 5 and 6 are suitably interpositioned and mounted within casing 7. As illustrated, the plates 5 are conductively connected by common conductor 8, whereas the plates 6 conductively connect with bar 9. Any arrangement of plates may be improvised to suit requirements of capacity and any form or type of plate may be used to suit engineering expediency.

Bellows 10 represents any suitable means adapted to expand or otherwise respond to changes in temperature. In one type of control it may be desirable to have an instrument responsive to temperature changes, whereas under other conditions it may be desirable to be governed by means responsive to variations in humidity, or to variations in both temperature and humidity. In the illustrative embodiment, the bellows may be assumed to be of a character adapted to expand and contract responsive to changes in temperature. The rod 9 is suitably connected to the bellows and hence will be actuated by the bellows. Adjusting screw 11 suitably mounted within casing 7 provides a spring support 12 for the extreme of the bar not connected to the bellows. The condenser plates 5 and 6 are electrically connected to terminals 13 and 14 respectively.

In the arrangement of Fig. 1 valve 15 is controlled by means whose operating effect is determined by the impedance of a circuit in which the means are located. The circuit includes condenser thermostat 4, adjustable inductance coil 16, and heater element 17. Bellows member 18 is suitably mounted within casing 19 and is connected to driving element 20 which controls the seat of valve 15.

The impedance of the circuit equals the inductive reactance plus capacity reactance plus resistance of the circuit. Assuming $Z$=the impedance of the circuit, then $$Z = \sqrt{K_1 - K_2 + R},$$

where $K_1$=the impedance of the condenser, $K_2$=the impedance of the inductance coil, and $R$=the resistance in the circuit due to the heater element and connections.

Thus, assuming that there is a rise in temperature, bellows 10 will expand. The distance between sets of plates 5 and 6 will therefore decrease, in accordance with the arrangement of the plates. The capacity will therefore increase. As a result, the current in the circuit will increase and concomitantly affect the heater. The heater will correspondingly cause sylphon 18 to operate the valve through rod 20. It may be noted that the arrangement is susceptible to fine adjustment in that a comparatively small movement of the expansion member may effect an appreciable change in the operation or setting of the valve. Also, this sensitivity is not limited to precise settings, inasmuch as there are no exact number of settings of the valve which the sylphon controls, since the valve may be made to assume any number of settings and hence exactly respond to any number of changes in affecting conditions.

The arrangement of Fig. 1 need not be used with bellows 10 as an operating element. For example, if bellows 10 were omitted, satisfactory results can be obtained by filling the casing 7 with a liquid 21. This liquid may be glycerin, ethylene, glycol and similar media whose specific inductive capacity will correspondingly change with changes in temperature. Thus, if in the arrangement of Fig. 1 the casing were filled with a liquid of this character, the impedance of the circuit would be changed responsive to changes in temperature and consequently affect the heater element 17 to control the valve.

Similarly, it would be possible to separate plates 5 and 6 with a material, or use dielectric, whose specific inductive capacity varies with changes in temperature. Applicant limits himself to no specific means and any analogous arrangement whose operating effect results in varying the capacity of a circuit responsive to temperature changes, is considered within the scope of the invention. It may be noted that applicant's arrangement may be employed to effect direct or reverse action in an instrument of device to be controlled. This may be done by changing the value of $K_1$ or $K_2$. That is, if the constant value of the inductance coil is made less or greater than that of the variable, the condenser, the impedance of the circuit may be changed to bring about a direct or reverse action.

While the arrangement may be used for control or regulating purposes, it may also be used for indicating purposes. Any indicating device may be inserted in the line, or may be connected across the condenser, or may otherwise be suitably arranged, and will indicate the variations in current or changes in condition according to any desired indicia.

Instead of having the change in temperature as the controlling factor, it is equally possible to have the arrangement operate responsive to changes in relative humidity. In Fig. 3 a condenser arrangement is shown in which plates 22 comprise a series of perforated paper elements. These plates may be of any desired number, and although paper is mentioned, it is equally possible to use any other material whose dielectric constant varies with the relative humidity. If this arrangement was substituted for the condenser of Fig. 1, it would cause valve 15 to be governed in accordance with changes in relative humidity instead of temperature changes. For convenience, applicant names the arrangement of Fig. 3 a hygrostat condenser, because its variations are responsive to changes in relative humidity. It is evident that applicant may use an insulating material, in the arrangement of Fig. 3, whose dielectric constant may vary with temperature or with temperature and relative humidity. No limitation is placed upon the material, and in fact, applicant in some instances proposes to use air or gas between the plates of his condenser arrangements.

In Fig. 2 chamber 23 is connected to a pressure source through port 24. Any suitable liquid 25 will therefore enter condenser chamber 26 in varying amounts, determined by the pressure head in chamber 23. This pressure is suitably controlled and hence will determine the extent to which the condenser plates will be covered. Consequently, the extent of the pressure will determine the resistance of a circuit in which the arrangement of Fig. 2 is located. If the liquid has a high specific inductive capacity, such as glycerin, an appreciable variation in the resistance of the circuit will be brought about. Thus, applicant's invention provides a means for electrically controlling devices responsive to changes in pressure as well as to changes in atmospheric conditions or thermostatic, hygrostatic or humidistatic conditions.

It is evident that the condenser arrangements of Fig. 2 and Fig. 3 may be suitably employed to control valves, dampers or the like, in any suitable circuit, (as in the circuit of Fig. 1), lead 27 connecting to a suitable source of current and lead 28 connecting to a variable induction resistance or the like.

By using a plurality of arrangements, such as that shown in Fig. 1, if set to actuate a valve or similar control at a definite level or limit, it is possible to maintain a desired differential in temperature or relative humidity between conditions at different points whose nature is subject to fluctuation.

While applicant shows certain forms of application, any equivalent system of control or measurement, using an electrically controlled device operative responsive to changes in pressure or atmospheric conditions, is deemed within the purview of the invention.

Having described my invention, what I claim as new and desired to secure by Letters Patent is:

1. In a system of the character described, a condenser having a plurality of plates, a thermal responsive element, means connecting the element to said condenser whereby the distance between the plates will be varied responsive to variations in thermal conditions surrounding the element, an electrical circuit including said condenser, a heater element in said circuit, a second thermal element, a device operated under control of said second thermal element, said second thermal element being adapted to control said device responsive to changes in the capacity of the condenser.

2. In a system of the character described, a valve, means for controlling said valve, including a condenser, means responsive to changes in temperature for varying the capacity of the condenser, an electrical circuit including said condenser, a heater element in the circuit, a second means adapted to respond to changes in temperature, said second means being connected to said valve and operative responsive to changes in the capacity of the condenser to control said valve.

3. In a system for controlling the opening and closing of a device, a condenser, an electrical circuit including said condenser, a bellows and means responsive to the functioning of said bellows for varying the capacity of the condenser, a second bellows, a resistance in the circuit controlling the operation of said second bellows responsive to variations in impedance of said circuit and means connected to the bellows for controlling the opening and closing of the device.

4. In a regulating system of the character described, a circuit including a condenser, a variable induction resistance, a heater element, means for varying the capacity of the condenser responsive to changes in temperature surrounding a thermo-responsive device, a second thermo-responsive device under control of said resistance, said second device having means for governing a regulating device.

5. A system for positioning a damper in positions, comprising a condenser, an electrical circuit including said condenser, the plates of said condenser being adapted to vary the capacity of the condenser responsive to changes in relative humidity in a given area, an expansible bellows, a resistance in said circuit for controlling the operation of said bellows responsive to changes in the capacity of the condenser, and means in combination with the bellows for varying the position of a damper.

In testimony whereof I affix my signature.
THOMAS JEFFERSON ATKINS.

CERTIFICATE OF CORRECTION.

Patent No. 1,882,726.                                                                        October 18, 1932.

THOMAS JEFFERSON ATKINS.

It is hereby certified that error appears in the printed specification of the above numbered patent requiring correction as follows: Page 3, line 37, claim 1, for "operated" read "operative"; and line 73, claim 5, after "in" insert the letter "n"; and that the said Letters Patent should be read with these corrections therein that the same may conform to the record of the case in the Patent Office.

Signed and sealed this 13th day of December A. D. 1932.

M. J. Moore, (Seal)                                                     Acting Commissioner of Patents.